United States Patent [19]
Evans et al.

[11] Patent Number: 6,143,061
[45] Date of Patent: Nov. 7, 2000

[54] DELOCALIZED CATIONIC AZO DYE FOR INK JET INK

[75] Inventors: Steven Evans; Csaba A. Kovacs, both of Rochester; Ellen M. Pyszczek, LeRoy; Helmut Weber, Webster, all of N.Y.

[73] Assignee: Eastman Kodak Company, Rochester, N.Y.

[21] Appl. No.: 09/299,480

[22] Filed: Apr. 26, 1999

[51] Int. Cl.$^7$ ..................................................... C09D 11/02
[52] U.S. Cl. ................... 106/31.48; 106/31.5; 106/31.58
[58] Field of Search ............................ 106/31.47, 31.48, 106/31.49, 31.5, 31.58; 534/607, 770, 774

[56] References Cited

U.S. PATENT DOCUMENTS

| | | | |
|---|---|---|---|
| 3,770,719 | 11/1973 | Fisher et al. | 534/610 |
| 4,268,438 | 5/1981 | Furstenwerth | 534/607 |
| 4,929,277 | 5/1990 | Tanaka et al. | 106/31.5 |
| 5,208,325 | 5/1993 | Berneth et al. | 106/31.5 |
| 5,468,258 | 11/1995 | Janssens et al. | 8/471 |
| 5,560,996 | 10/1996 | Ito et al. | 428/500 |
| 5,952,475 | 9/1999 | Berneth | 106/31.5 |

*Primary Examiner*—Helene Klemanski
*Attorney, Agent, or Firm*—Harold E. Cole

[57] ABSTRACT

An ink jet ink composition comprising water, a humectant, and a delocalized cationic azo dye derived from the quatemization of a heterocyclic azoaminothiazole dye.

11 Claims, No Drawings

DELOCALIZED CATIONIC AZO DYE FOR INK JET INK

FIELD OF THE INVENTION

This invention relates to a certain delocalized cationic azo dye useful as a colorant in an ink jet ink composition.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimagined droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength (λ-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes which meet all of these requirements.

Aqueous dye-based inks for high-quality, photo-realistic, ink jet printing require water-soluble dyes with excellent color and high light- and water-fastness. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy.

Another group of dyes are basic or cationic dyes which were developed mainly for the dyeing of synthetic textile fibers such as acrylics and acid-modified polyesters. These dyes are positively charged, due to either the incorporation of pendant, positively-charged substituent groups, such as tetraalkylammonium or by virtue of the basic chromophore comprising a delocalized cationic system such as a cyanine, azacyanine or azo (diazacyanine).

U.S. Pat. No. 5,560,996 discloses a variety of cationic dyes, including cationic azo dyes such as Basic Red 46 and other cationic magenta dyes such as Basic Reds 12, 14 and 15 for use in an ink jet ink. As will be shown below, these dyes have poor light stability.

U.S. Pat. No. 3,770,719 relates to cationic heterocyclic azoaminothiazoles useful for the traditional dyeing of polyacrylonitrile, polyester and graft polymer fibers. However, there is no teaching that these dyes would be useful in aqueous inks for an ink jet composition.

U.S. Pat. No. 5,468,258 relates to dye donor elements for thermal dye transfer imaging comprising water-insoluble heterocyclic hydrazono dyes. The broad disclosure of this reference includes the deprotonated electrically neutral precursors of the dyes employed in this invention. However, there is no teaching that these dyes may be protonated to generate cationic dyes or that such cationic dyes would be useful in aqueous inks for an ink jet composition.

It is an object of this invention to provide cationic dyes suitable for use in aqueous inks for ink jet printing that will provide bright, light stable images.

SUMMARY OF THE INVENTION

This and other objects are achieved in accordance with this invention which relates to an ink jet ink composition comprising water, a humectant, and a delocalized cationic azo dye derived from the quaternization of a heterocyclic azoaminothiazole dye.

It has been found that delocalized cationic azo dyes derived from the quatemization of heterocyclic azoaminothiazole dyes and their deprotonated electrically neutral precursors are useful for the production of aqueous inks for ink jet printing and give bright red to violet images with good light stability.

DETAILED DESCRIPTION OF THE INVENTION

In a preferred embodiment of the invention, the delocalized cationic azo dye derived from the quatemization of a heterocyclic azoaminothiazole dye has the following formula:

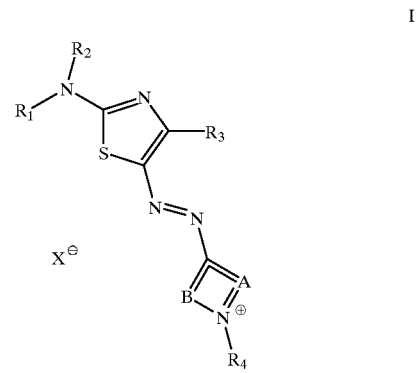

wherein:
  $R_2$ and $R_4$ each independently represents a substituted or unsubstituted alkyl group of 1–6 carbon atoms, a substituted or unsubstituted allyl group, a substituted or unsubstituted aryl group of 6–10 carbon atoms, a substituted or unsubstituted hetaryl group of 5–10 atoms or a polyoxyalkylene group of 2–20 alkylene oxide residues;
  $R_1$ represents hydrogen or the same groups as listed above for $R_3$ and $R_4$;
  $R_3$ represents the same groups listed above for $R_1$, halogen, nitro, cyano, a substituted or unsubstituted alkoxy group of 1–6 carbon atoms, a substituted or unsubstituted alkoxycarbonyl group of 1–6 carbon atoms, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, ureido, sulfonylamino, amino, a substituted or unsubstituted alkyl-, aralkyl-, aryl-, diaryl- or dialkyl-amino group of 1–20 carbon atoms, a quaternary ammonium group or a phosphonium group;

A and B each independently represents direct bonds or the atoms necessary to complete a 5- or 6-membered heteroaromatic ring system, with the proviso that the $N^+$—$R_4$ group is in conjugation with the azo group;

the atoms represented by A and/or B may be optionally substituted with $R_3$;

$X^-$ represents an anion; and $R_1$ and $R_2$, and $R_4$ and the atoms of A or B may independently be combined to form a 5- to 7-membered hetero- or carbocyclic ring.

In a preferred embodiment of the invention, $R_1$ in the above formula represents H. In another preferred embodiment, $R_2$ represents methyl, phenyl, 2-methoxyphenyl or allyl. In another preferred embodiment, $R_3$ represents phenyl, t-butyl or 4-methoxyphenyl. In still another preferred embodiment, $R_4$ represents methyl or ethyl. In yet another preferred embodiment, A represents —C(CN)=CH—, —CH=C(CH$_3$)— or —CH=CH—. In still yet another preferred embodiment, B represents —N(CH$_3$)—, —N(C$_6$H$_5$)—, —N(2-CH$_3$—C$_6$H$_4$)— or —N(4-CH$_3$O—C$_6$H$_4$)—.

In the above definition, examples of a substituted or unsubstituted alkyl group include methyl, ethyl, isopropyl, hydroxyethyl, 3-(N,N-dimethylamino)propyl and benzyl. Examples of a substituted or unsubstituted aryl group include phenyl, naphthyl and 4-chlorophenyl. Examples of a substituted or unsubstituted hetaryl group include pyridyl, imidazolyl and quinolyl. Examples of a polyoxyalkylene group of 2–20 alkylene oxide residues include 3,6,9-trioxadecyl, 11-hydroxy-3,6,9-trioxa-5,8-dimethyldodecyl and 11-hydroxy-3,6,9-trioxaundecyl. Examples of halogen include chloro, fluoro, bromo and iodo. Examples of a substituted or unsubstituted alkoxy group include methoxy, isopropoxy and 2-hydroxyethoxy. Examples of a substituted or unsubstituted alkoxycarbonyl group of 1–6 carbon atoms include methoxycarbonyl, ethoxycarbonyl and 3-hydroxypropylcarbonyl. Examples of a substituted or unsubstituted alkyl-, aralkyl-, aryl-, diaryl- or dialkyl carbamoyl group include N-methylcarbamoyl, N-methyl-N-phenyl-carbamoyl, N-p-(trimethylammonium)-phenylcarbamoyl and N,N-bis(4-dimethylaminophenyl) carbamoyl. Examples of a substituted or unsubstituted alkyl-, aralkyl-, aryl-, diaryl- or dialkyl sulfamoyl group include N-methyl-sulfamoyl, N-methyl-N-phenyl-sulfamoyl, N-p-(trimethylammonium)-phenylsulfamoyl and N,N-bis(4-dimethylaminophenyl)-sulfamoyl. Examples of an acylamino group include acetamido, methoxyethyl-acetamido and benzamido. Examples of a ureido group include N-methylureido, ureido and N,N'-dimethyl-ureido. Examples of a sulfonylamino group include methanesulfonamido, p-toluenesulfonamido and 2-(trimethlyammonium)-ethanesulfonamido. Examples of a substituted or unsubstituted alkyl-, aralkyl-, aryl-, diaryl- or dialkyl-amino group include methylamino, N,N-dimethylamino, methoxyethylamino and anilino. Examples of a quaternary ammonium group include trimethylammonium and benzyldimethylammonium. Examples of a phosphonium group include triphenylphosphonium and trimethylphosphonium.

Examples of heteroaromatic ring systems completed by the atoms represented by A and B include pyrazolium, benzothiazolium, 1,2,4-triazolium, 2-pyridinium, 4-pyridinium, 1,3,4-thiadiazolium, thiazolium, 2-quinolinium and isothiazolium.

Examples of $X^-$ include chloride, methosulfate, acetate, chloroacetate, trifluoroacetate, methanesulfonate, p-toluenesulfonate, lactate, citrate, gluconate and 3-ureidopropionate. In a preferred embodiment, $X^-$ is citrate, gluconate or lactate.

As noted above, the dyes which are employed in the invention and the synthesis thereof are described in U.S. Pat. No. 3,770,719, the disclosure of which is hereby incorporated by reference.

The water solubility of cationic dyes is significantly affected by the nature of the counterion $X^-$. The counterion preferred for solubility is often not readily incorporated during the synthesis. Ion exchange via ion exchange resins or dialysis/ultrafiltration is often difficult, time consuming and/or expensive. In addition, it is often difficult to isolate, purify and characterize the preferred salt forms of the dyes due to their high water solubility.

A particularly preferable embodiment of this invention results when $R_1$ in the structure I above is H. In this case, the electrically neutral, deprotonated form of the cationic dye (e.g., II below) may conveniently be isolated by treatment of the cationic dye with a base, purified and characterized. The cationic dye with the desired counterion may be regenerated by simply dissolving the electrically neutral form of the dye in an aqueous solution of the conjugate acid of the counterion during the preparation of the ink. This process is shown by the following:

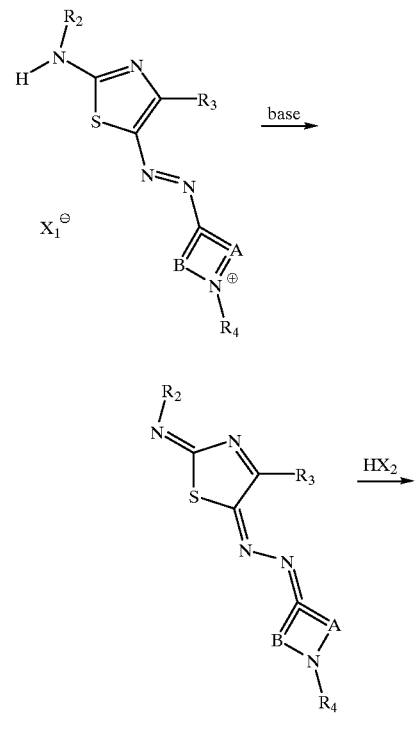

II

-continued

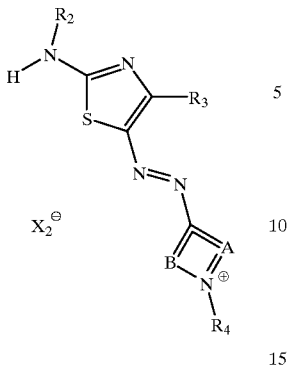

Representative examples of the deprotonated electrically neutral precursors of the cationic dyes employed in the invention are listed below.

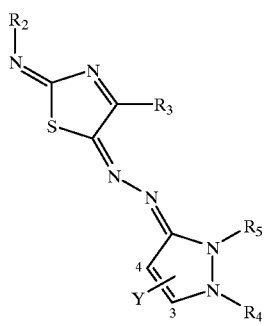

| Dye | $R_2$ | $R_3$ | $R_4$ | $R_5$ | Y | λ-max of cationic dye (ε)[1] |
|---|---|---|---|---|---|---|
| 1 | $CH_3$ | $C_6H_5$ | $CH_3$ | $CH_3$ | 4-CN | 519 (36,300) |
| 2 | $CH_3$ | $C_6H_5$ | $CH_3$ | $C_6H_5$ | 4-CN | 528 (37,200) |
| 3 | $C_6H_5$ | $C_6H_5$ | $CH_3$ | $CH_3$ | 3-$C_6H_5$ | 501 (34,300) |
| 4 | CH₃O-C₆H₄-(o-CH₃) | $t\text{-}C_4H_9$ | $CH_3$ | $C_6H_5$ | 3-$CH_3$ | 504 (33,100) |
| 5 | allyl | $C_6H_5$ | $CH_3$ | CH₃-C₆H₄-(o-CH₃) | 4-CN | 531 (37,400) |
| 6 | allyl | 4-OCH₃-C₆H₄- | $CH_3$ | $C_6H_5$ | 3-$CH_3$ | 514 (32,100) |
| 7 | allyl | $C_6H_5$ | $CH_3$ | 4-OCH₃-C₆H₄- | 3-$CH_3$ | 494 (32,700) |
| 8 | allyl | $C_6H_5$ | $C_2H_5$ | $C_6H_5$ | H | 502 (32,300) |

-continued
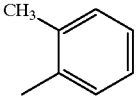
| Dye | $R_2$ | $R_3$ | $R_4$ | $R_5$ | Y | λ-max of cationic dye (ε)[1] |
|---|---|---|---|---|---|---|
| 9 | $C_6H_5$ | $t\text{-}C_4H_9$ | $CH_3$ | (o-tolyl, $CH_3$) | 3-$CH_3$ | 505 (38,200) |
| 10 | $CH_3$ | $C_6H_5$ | $CH_3$ | $C_6H_5$ | 3-$CH_3$ | 501 (34,400) |
[1]Measured in 5% aqueous acetic acid; ε (extinction coefficient) in L mol$^{-1}$cm$^{-1}$
Other cationic azoamninothiazole dyes within the scope of this invention include the following:
Dye 11
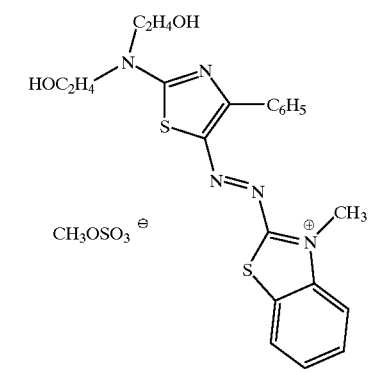
Dye 12
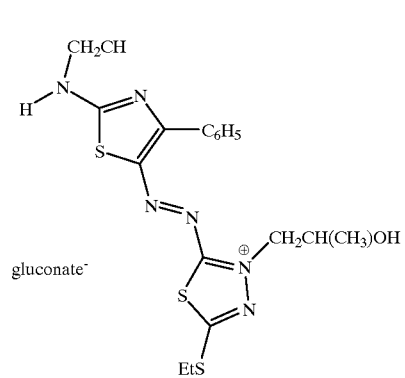
-continued
Dye 13
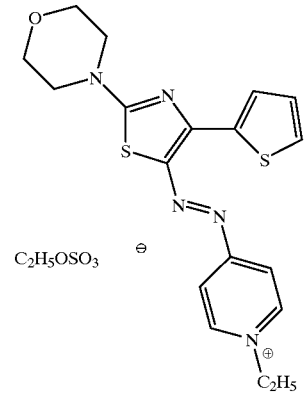
Dye 14
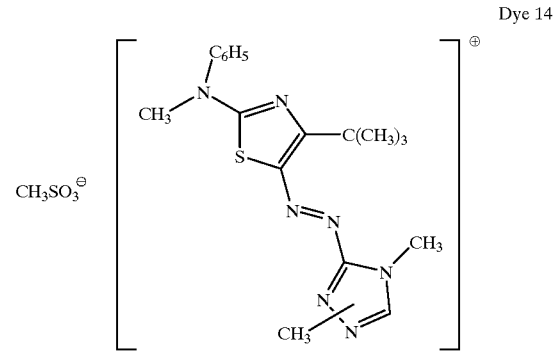

-continued

Dye 15

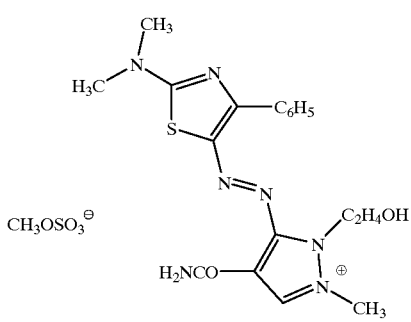

Dye 16

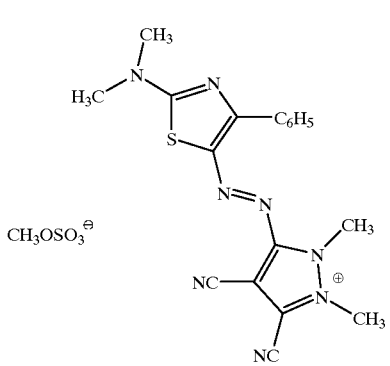

In general, the above dyes comprise from about 0.2 to about 5%, preferably from about 0.5 to about 3% by weight of the ink jet ink composition.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition of the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

Synthesis of Dye 1

The following procedure is representative of the procedures used to prepare the novel cationic pyrazole azothiazole dyes employed in the invention and their deprotonated, electrically neutral precursors.

To a cold (0–5° C.) mixture of nitrosylsulfuric acid (freshly prepared from 12.32 g, 0.1785 mole, sodium nitrite and 170 g concentrated sulfuric acid) and 100 mL of a 1:5 mixture of propionic and acetic acids, 1:5 acid, was added a suspension of 20.74 g, 0.17 mole, 1-methyl-4-cyano-5-aminopyrazole in 150 mL of 1:5 acid. After stirring at 0–5° C. for 3 hr., excess nitrous acid was destroyed by adding 0.5 g of urea and the mixture was added to a solution of 32.3 g, 0.17 mole, 2-(N-methylamino)-4-phenylthiazole in 300 mL of acetic acid at ambient temperature. After stirring for 1 hour, 275 g sodium acetate suspended in 400 mL water was added, followed by 2000 mL of ice water. The dark purple solid was collected by filtration and washed well with water. The crude product was then digested with 750 mL of boiling methanol, cooled and filtered to yield 54.9 g of 2-(N-methylamino)-4-phenyl-5-(1-methyl-4-cyanopyrazol-5-ylazo)thiazole as a dark purple solid.

To a suspension of 40 g, 0.124 mole, of the above pyrazoleazothiazole dye in 400 mL of butyronitrile was added 115.4 g, 0.62 mole, of methyl-p-toluenesulfonate and the resulting mixture heated at reflux for 24 hours. Cooling to 0–5° C., collecting the solid, rinsing with cold butyronitrile followed by ethyl acetate and drying yielded 40.75 g of 2-(N-methylamino)-4-phenyl-5-(1,2-dimethyl-4-cyanopyrazol-5-ylazo)-thiazolium p-toluenesulfonate as dark purple solid.

To a suspension of 10.24 g, 0.0201 mole, of the above cationic dye p-toluenesulfonate in 200 mL methanol was added 8.4 mL, 0.06 mole, triethylamine. After stirring at ambient temperatures for 3 hours, the solid was collected by filtration and dried to yield 6.77 g (90.9% of theory) of Dye 1, λ-max 519 in 5% aqueous acetic acid.

The following control dyes were evaluated as comparative examples:

TABLE 1

| Ink | Dye | Wt. % Dye | Wt. % Lactic Acid |
|-----|-----|-----------|-------------------|
| 1   | 1   | 0.93      | 1.0               |
| 2   | 2   | 1.08      | 2.5               |
| 3   | 3   | 1.21      | 2.5               |
| 4   | 4   | 1.39      | 2.5               |

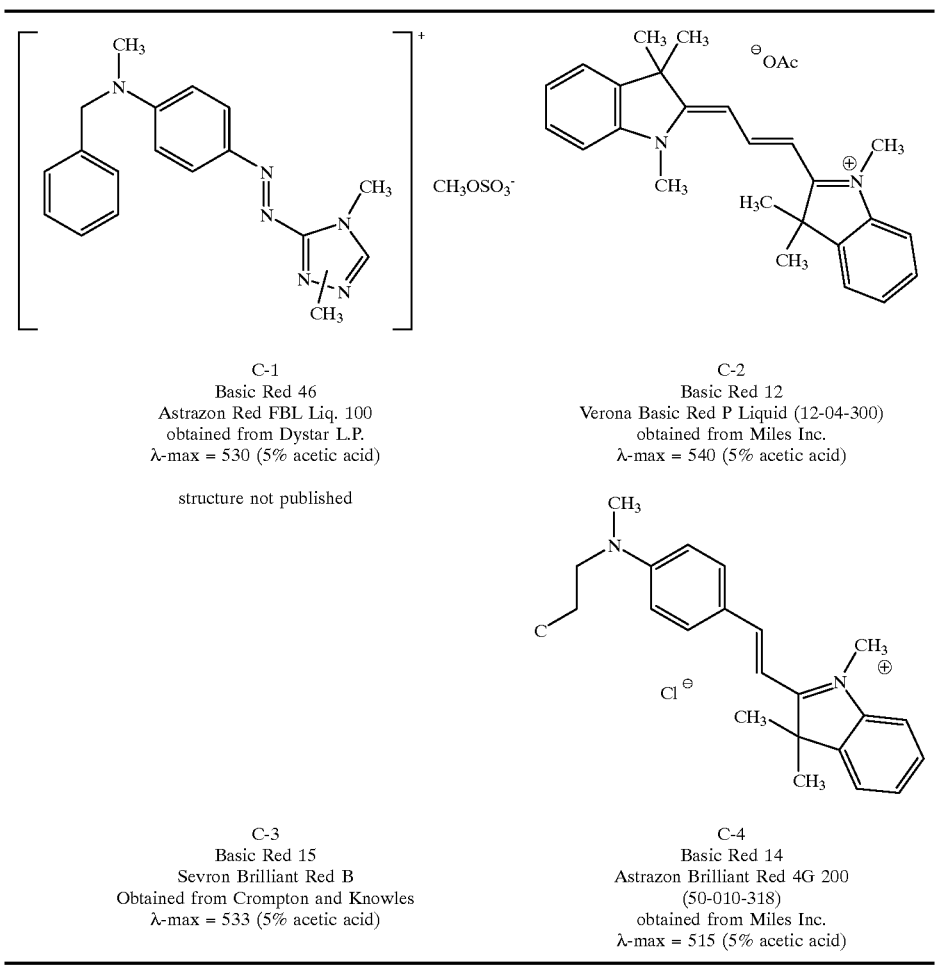

C-1
Basic Red 46
Astrazon Red FBL Liq. 100
obtained from Dystar L.P.
λ-max = 530 (5% acetic acid)

structure not published

C-2
Basic Red 12
Verona Basic Red P Liquid (12-04-300)
obtained from Miles Inc.
λ-max = 540 (5% acetic acid)

C-3
Basic Red 15
Sevron Brilliant Red B
Obtained from Crompton and Knowles
λ-max = 533 (5% acetic acid)

C-4
Basic Red 14
Astrazon Brilliant Red 4G 200
(50-010-318)
obtained from Miles Inc.
λ-max = 515 (5% acetic acid)

Preparation of Inks.

Inks containing the dyes of the invention and control dyes were prepared by dissolving an appropriate amount of the dye in deionized water containing humectants of diethylene glycol and glycerol, each at 6 wt. %, a biocide, Proxel GXL® at 0.003 wt. % and a surfactant, Surfynol 465® (Air Products Co.) at 0.5 wt. %. Lactic acid was optionally added to help solubilize the dyes and/or convert the electrically neutral, deprotonated forms of the dyes into the corresponding lactate salts.

The dye concentrations were based on solution absorption spectra and chosen such that the final ink, when diluted 1:1000, would yield a transmission optical density of approximately 1.0. Table 1 gives the various ink formulation details.

TABLE 1-continued

| Ink | Dye | Wt. % Dye | Wt. % Lactic Acid |
|-----|-----|-----------|-------------------|
| 5   | 5   | 1.17      | 2.5               |
| 6   | 6   | 1.38      | 2.5               |
| 8   | 8   | 1.28      | 2.5               |
| 10  | 10  | 1.13      | 2.5               |
| C-1 | C-1 | 2.19      | —                 |
| C-2 | C-2 | 0.54      | 2.0               |
| C-3 | C-3 | 3.42      | 2.5               |
| C-4 | C-4 | 1.62      | 2.5               |

Printing of Test Images.

The above inks were then filtered through a 0.45μ polytetrafluoroethylene filter and placed in a clean Hewlett-Packard ink cartridge No. HP 51629A and fitted into the black ink station of a Hewlett-Packard Deskjet 600® printer. A test image consisting of a series of 21 variable density patches, approximately 15 by 13 mm in size, ranging from 5% dot coverage to 100% dot coverage was printed onto commercially-available Kodak Inkjet Photographic Quality Paper, Catalog No. 899-9161, and allowed to dry for 24 hours at ambient temperature and humidity.

Evaluation of Test Images

For each ink, the Status A green reflection densities of the above patches corresponding to 75% and 100% dot coverage were measured using an X-Rite 820® densitometer. The green density at 100% dot coverage (D-max) is listed in the Table below.

The stepped images were then subjected to light fade under 50 Klux high-intensity daylight irradiation and 50% relative humidity for 1 week. The Status A green densities of the stepped images were remeasured and the light fade loss % in Status A green density for the 75% dot coverage patches were calculated for each ink and are also listed in the Table below.

TABLE 2

| Ink | D-max | Light Fade Loss (%) |
|-----|-------|---------------------|
| 1   | 2.5   | 14                  |
| 2   | 2.0   | 10                  |
| 3   | 1.6   | 11                  |
| 4   | 2.1   | 11                  |
| 5   | 2.2   | 17                  |
| 6   | 2.1   | 16                  |
| 8   | 2.0   | 8                   |
| 10  | 1.9   | 7                   |
| C-1 | 2.3   | 19                  |
| C-2 | 1.6   | 79                  |
| C-3 | 1.8   | 69                  |
| C-4 | 2.2   | 63                  |

The above result show that the dyes employed in the invention give high density images with better light stability than the cationic dyes of the prior art.

The invention has been described in detail with particular reference to certain preferred embodiments thereof, but it will be understood that variations and modifications can be effected within the spirit and scope of the invention.

What is claimed is:

1. An ink jet ink composition comprising water, a humectant, and a delocalized cationic azo dye derived from the quaternization of a heterocyclic azoaminothiazole dye.

2. The composition of claim 1 wherein said delocalized cationic azo dye derived from the quaternization of a heterocyclic azoaminothiazole dye has the following structure:

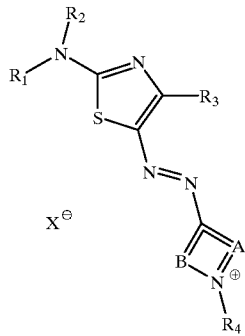

wherein:

$R_2$ and $R_4$ each independently represents a substituted or unsubstituted alkyl group of 1–6 carbon atoms, a substituted or unsubstituted allyl group, a substituted or unsubstituted aryl group of 6–10 carbon atoms, a substituted or unsubstituted hetaryl group of 5–10 atoms or a polyoxyalkylene group of 2–20 alkylene oxide residues;

$R_1$ represents hydrogen or the same groups as listed above for $R_3$ and $R_4$;

$R_3$ represents the same groups listed above for $R_1$, halogen, nitro, cyano, a substituted or unsubstituted alkoxy group of 1–6 carbon atoms, a substituted or unsubstituted alkoxycarbonyl group of 1–6 carbon atoms, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, ureido, sulfonylamino, amino, a substituted or unsubstituted alkyl-, aralkyl-, aryl-, diaryl- or dialkyl-amino group of 1–20 carbon atoms, a quaternary ammonium group or a phosphonium group;

A and B each independently represents direct bonds or the atoms necessary to complete a 5- or 6-membered heteroaromatic ring system, with the proviso that the $N^+$—$R_4$ group is in conjugation with the azo group;

the atoms represented by A and/or B may be optionally substituted with $R_3$;

$X^-$ represents an anion; and $R_1$ and $R_2$, and $R_4$ and the atoms of A or B may independently be combined to form a 5- to 7-membered hetero- or carbocyclic ring.

3. The composition of claim 2 wherein $R_1$ in the above formula represents H.

4. The composition of claim 2 wherein $R_2$ represents methyl, phenyl, 2-methoxyphenyl or allyl.

5. The composition of claim 2 wherein $R_3$ represents phenyl, t-butyl or 4-methoxyphenyl.

6. The composition of claim 2 wherein $R_4$ represents methyl or ethyl.

7. The composition of claim 2 wherein $X^-$ represents citrate, gluconate or lactate.

8. The composition of claim 2 wherein A represents —C(CN)=CH—, —CH=C(CH$_3$)— or —CH=CH—.

9. The composition of claim 2 wherein B represents —N(CH$_3$)—, —N(C$_6$H$_5$)—, —N(2-CH$_3$—C$_6$H$_4$)— or —N(4-CH$_3$O—C$_6$H$_4$)—.

10. The composition of claim 1 wherein said humectant is diethylene glycol, glycerol or diethylene glycol monobutylether.

11. The composition of claim 1 wherein said dye comprises about 0.2 to about 5% by weight of said ink jet ink composition.

* * * * *